United States Patent
Li et al.

(10) Patent No.: US 12,494,322 B2
(45) Date of Patent: Dec. 9, 2025

(54) PREPARATION METHOD FOR ANISOTROPIC $Nd_2Fe_{14}B/\alpha$-Fe BULK NANOCRYSTALLINE COMPOSITE PERMANENT MAGNET MATERIAL

(71) Applicant: Yanshan University, Qinhuangdao (CN)

(72) Inventors: Xiaohong Li, Qinhuangdao (CN); Jinyi Wang, Qinhuangdao (CN); Jianyuan Kou, Qinhuangdao (CN); Peng Chen, Qinhuangdao (CN); Yan Zheng, Qinhuangdao (CN); Li Lou, Qinhuangdao (CN); Xiangyi Zhang, Qinhuangdao (CN)

(73) Assignee: Yanshan University, Qinhuangdao (CN)

( * ) Notice: Subject to any disclaimer, the term of this patent is extended or adjusted under 35 U.S.C. 154(b) by 0 days.

(21) Appl. No.: 19/245,653

(22) Filed: Jun. 23, 2025

(65) Prior Publication Data

US 2025/0316419 A1    Oct. 9, 2025

Related U.S. Application Data

(63) Continuation of application No. PCT/CN2024/102885, filed on Jul. 1, 2024.

(30) Foreign Application Priority Data

Jul. 7, 2023 (CN) .......................... 202310828366.7

(51) Int. Cl.
| | |
|---|---|
| H01F 41/02 | (2006.01) |
| B22F 3/02 | (2006.01) |
| B22F 3/18 | (2006.01) |
| B22F 9/00 | (2006.01) |
| B22F 9/04 | (2006.01) |
| C22C 33/04 | (2006.01) |
| C22C 38/00 | (2006.01) |
| C22C 38/16 | (2006.01) |
| H01F 1/057 | (2006.01) |

(52) U.S. Cl.
CPC ............ *H01F 41/0266* (2013.01); *B22F 3/02* (2013.01); *B22F 3/18* (2013.01); *B22F 9/008* (2013.01); *B22F 9/04* (2013.01); *C22C 33/04* (2013.01); *C22C 38/002* (2013.01); *C22C 38/005* (2013.01); *C22C 38/16* (2013.01); *H01F 1/057* (2013.01); *B22F 2009/043* (2013.01); *B22F 2301/355* (2013.01); *B22F 2998/10* (2013.01); *B22F 2999/00* (2013.01)

(58) Field of Classification Search
None
See application file for complete search history.

(56) References Cited

FOREIGN PATENT DOCUMENTS

| | | | |
|---|---|---|---|
| CN | 101593591 A | * | 12/2009 |
| CN | 102360653 A | | 2/2012 |
| CN | 103996521 A | | 8/2014 |
| JP | H10270224 A | | 10/1998 |
| JP | 2004296873 A | | 10/2004 |

\* cited by examiner

*Primary Examiner* — Anthony M Liang
(74) *Attorney, Agent, or Firm* — Nitin Kaushik

(57) ABSTRACT

Disclosed in the present invention is a preparation method for an anisotropic $Nd_2Fe_{14}B/\alpha$-Fe bulk nanocrystalline composite permanent magnet material. The preparation method comprises the following steps: preparing a master alloy; crushing the master alloy into bulks, and, by means of a melt rapid quenching method, preparing amorphous ribbons; grinding the amorphous ribbons to obtain amorphous powder; cold-pressing the powder into bulks; and placing the bulks into a stainless steel mold, and heating and then rolling same, the stainless steel mold being of a plate-shaped structure, and a chamber for accommodating the bulks being formed in the stainless steel mold along the thickness direction thereof. The present invention presses the NdFeB amorphous powder into bulks, embeds same in the stainless steel mold, and performs rolling at a temperature below a crystallization temperature, so as to achieve high-temperature amorphous material crystallization.

15 Claims, 7 Drawing Sheets

PREPARATION METHOD FOR ANISOTROPIC $Nd_2Fe_{14}B/\alpha$-Fe BULK NANOCRYSTALLINE COMPOSITE PERMANENT MAGNET MATERIAL

CROSS-REFERENCE TO RELATED APPLICATIONS

The application claims priority to Chinese patent application No. 2023108283667, filed on Jul. 7, 2023, the entire contents of which are incorporated herein by reference.

TECHNICAL FIELD

The present invention relates to the technical field of permanent magnet materials, and in particular to a preparation method for an anisotropic $Nd_2Fe_{14}B/\alpha$-Fe bulk nanocrystalline composite permanent magnet material.

BACKGROUND

Bulk permanent magnet materials play a very important role in electric vehicles, wind power generation, aerospace, military, and other fields. The most important indicator for evaluating the performance of a permanent magnet material is its maximum magnetic energy product. At present, the permanent magnet with the best magnetic properties is neodymium-iron-boron (Nd—Fe—B), known as the "King of Permanent Magnets". However, a magnetic energy product of the existing Nd—Fe—B magnet materials is already close to its theoretical maximum value, yet still does not meet the demands of advanced technology for ultra-strong permanent magnets. To exceed the theoretical maximum value, it is necessary to improve the saturation magnetization of the material. One of the best ways is to form an $Nd_2Fe_{14}B/\alpha$-Fe nanocrystalline composite magnet by incorporating fine iron particles, which has higher saturation magnetization, into an Nd—Fe—B magnet at a nanoscale. This type of material has a higher theoretical magnetic energy product, offering a greater space for further development. Unfortunately, most $Nd_2Fe_{14}B/\alpha$-Fe bulk nanocrystalline composite permanent magnet materials prepared to date are isotropic, resulting in a relatively low magnetic energy product. This is because the theoretical magnetic energy product of an isotropic magnet is only one-fourth that of an anisotropic magnet. To prepare an $Nd_2Fe_{14}B/\alpha$-Fe nanocrystalline composite magnet with ultra-high performance, an $Nd_2Fe_{14}B$ phase in the magnet needs to exhibit preferential orientation along a c-axis at the nanoscale, thereby forming an anisotropic bulk magnet. However, it is very difficult to prepare such anisotropic bulk nanocrystalline material in practice.

SUMMARY

In view of the above technical problems, the present invention provides a preparation method for an anisotropic $Nd_2Fe_{14}B/\alpha$-Fe bulk nanocrystalline composite permanent magnet material.

In order to realize the above objective, the present invention adopts the following technical solution:

In one aspect, the present invention provides a preparation method for an anisotropic $Nd_2Fe_{14}B/\alpha$-Fe bulk nanocrystalline composite permanent magnet material, including the following steps:

step 1. preparing a master alloy;

step 2. crushing the master alloy prepared in the step 1 into bulks, and preparing amorphous ribbons by means of a melt rapid quenching method;

step 3. grinding the amorphous ribbons obtained in the step 2 to obtain amorphous powder;

step 4. cold-pressing the powder obtained in the step 3 into bulks; and step 5. placing the bulks obtained in the step 4 into a stainless steel mold, heating and then rolling the bulks; where the stainless steel mold is of a plate-shaped structure, and a chamber for accommodating the bulks is formed in the stainless steel mold in a thickness direction thereof.

In some specific embodiments, a temperature of the heating in the step 5 is 500-530° C.

In some specific embodiments, in the step 5, an inner diameter of the chamber matches an outer diameter of the bulk.

In some specific embodiments, after placing the bulk into the chamber formed in the stainless steel mold, the chamber is sealed using a metal material; where the metal material is preferably copper, and the sealing is performed in an inert atmosphere.

In some specific embodiments, the sealing is achieved by pressing a sheet-like metal material into the chamber containing the bulks using a hydraulic press to ensure the flatness of sealing, where the sheet-like metal material is slightly larger than the inner diameter of the chamber formed in the stainless steel mold.

In some specific embodiments, the stainless steel mold is a plate-shaped mold with a thickness of 5-10 mm; and a bottom thickness of the chamber is 0.3-0.5 mm, and the bottom thickness of the chamber refers to a thickness of the stainless steel at a bottom of the chamber.

In some specific embodiments, in the step 5, a roller speed of the rolling is 0.9-1.5 m/s.

In some specific embodiments, during a rolling process, a degree of deformation of the bulks is ≤70%; and in the technical solution of the present invention, the deformation ratio refers to a percentage of reduction in a height of the bulk.

In some specific embodiments, in the step 1, the master alloy has a chemical composition shown in Formula (1) as follows:

$$Nd_xFe_{y-m}B_zX_m; \quad (1)$$

in Formula (1), X is an additive element selected from at least one of Nb, Zr, Ti, Cu, Ga and Al; and m denotes a total atomic percentage of the additive element; the atomic percentage of a single additive element does not exceed 1 at %; and x, y, and z denote atomic percentages, where x is 8-10 at %, y is 84-88 at %, and z is 4-6 at %.

In some specific embodiments, the preparing a master alloy in the step 1 is usually carried out by a vacuum melting method.

In some specific embodiments, a rapid quenching speed during the melt rapid quenching in the step 2 is 27-32 m/s.

In some specific embodiments, a melt spinning temperature during the melt rapid quenching in the step 2 is 1250-1350° C.

In some specific embodiments, a thickness of the amorphous ribbons is 10-15 μm, with no limitation on a width.

In some specific embodiments, in the step 3, a method of the grinding is not particularly limited and may include manual grinding or ball milling; in order not to destroy the ribbon structure obtained in the step 2, the manual grinding is preferred; and in the technical solution of the present invention, the grinding is performed until a particle size of the amorphous powder is ≥300 mesh.

In some specific embodiments, a density of the cold-pressing into bulks in the step 4 is ≥80%; and In some specific embodiments, when the above powder is pressed into the bulk using a cold-pressing mold, an inner diameter of the mold may be 5-30 mm, a thickness of the cold-pressed bulk generally does not exceed 3 mm, and a pressing temperature may be a room temperature or an appropriate temperature, or the pressure may be performed in air or under an argon atmosphere.

In another aspect, the present invention provides an anisotropic $Nd_2Fe_{14}B/\alpha$-Fe bulk nanocrystalline composite permanent magnet material obtained from the above preparation method.

In the technical solution of the present invention, anisotropic $Nd_2Fe_{14}B/\alpha$-Fe bulk nanocrystalline composite permanent magnet material is composed of an $Nd_2Fe_{14}B$ phase and an $\alpha$-Fe phase, where a content of the $\alpha$-Fe phase is 20-40%, and grains of the $Nd_2Fe_{14}B$ phase grow in a preferred orientation, with crystallographic texture features of a diffraction peak (004) in a direction of compressive stress.

The above technical solutions of the present invention have the following advantages or beneficial effects:

In the preparation method of the present invention, the NdFeB amorphous powder is pressed into bulks and embedded in the stainless steel mold. After sealing, the sample is heated to a temperature below the crystallization temperature and then subjected to rolling. The heat generated during rolling raises the sample to a suitable temperature, and rolling with a large deformation ratio at this temperature induces high-temperature amorphous crystallization. During this process, significant stresses and strains are introduced by means of rolling, promoting the growth of the $Nd_2Fe_{14}B$ phase in preferred orientations. Meanwhile, the relatively high roller speed will inhibit the growth of the $\alpha$-Fe phase, such that the $Nd_2Fe_{14}B/\alpha$-Fe bulk nanocrystalline composite permanent magnet material having anisotropy is obtained. The preparation method provided by the present invention can prepare a nanocrystalline permanent magnet material with crystal texture, thereby realizing the preparation of high-performance anisotropic permanent magnets. The method is simple, easy to implement, and suitable for industrial production.

DETAILED DESCRIPTION OF THE EMBODIMENTS

The embodiments described below are merely some examples rather than all examples of the present invention. Therefore, the detailed description of the embodiments of the present invention is not intended to limit the scope of protection of the present invention, but merely illustrate selected embodiments of the present invention. On the basis of the embodiments in the present invention, all other embodiments acquired by those skilled in the art without making creative efforts fall within the scope of protection of the present invention.

Unless otherwise specified, all devices and raw materials used in the present invention are commercially available or commonly used in the field. The methods described in the following embodiments are conventional methods in the art, unless otherwise specifically indicated.

Example 1

Figure 1:
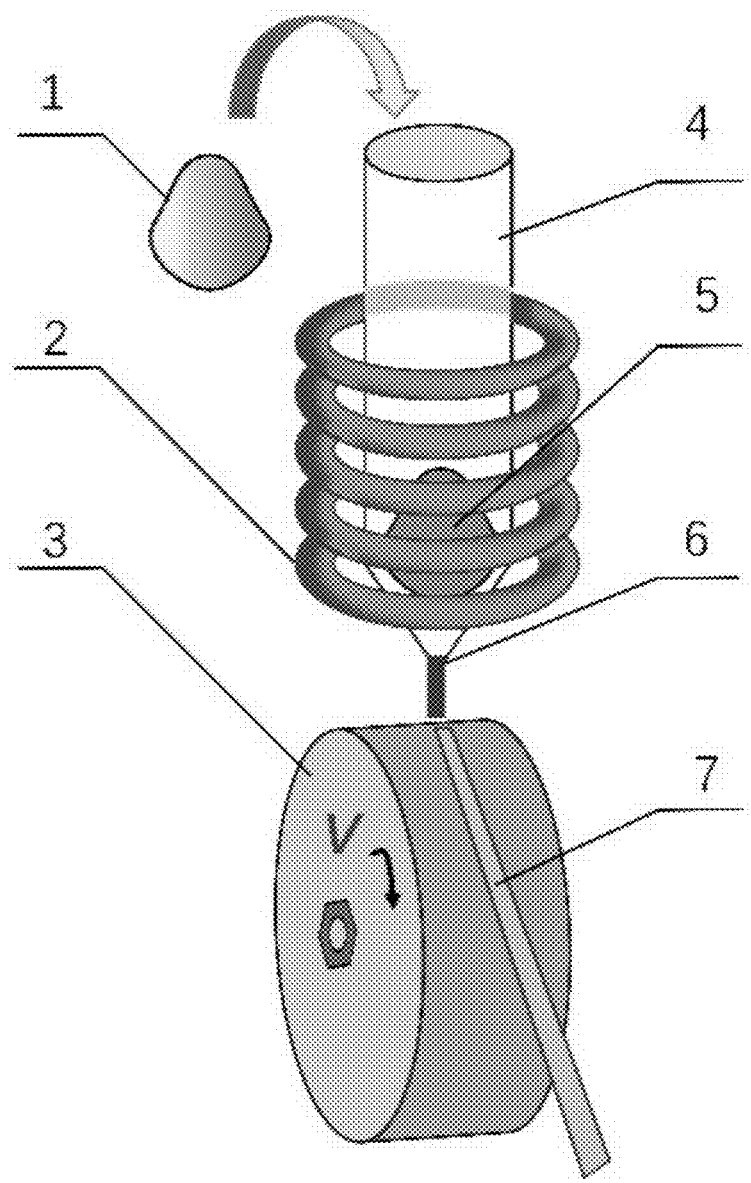
FIG. 1 is a schematic diagram of a melt rapid quenching process in a step 2 according to Example 1 of the present invention.
Figure 2:
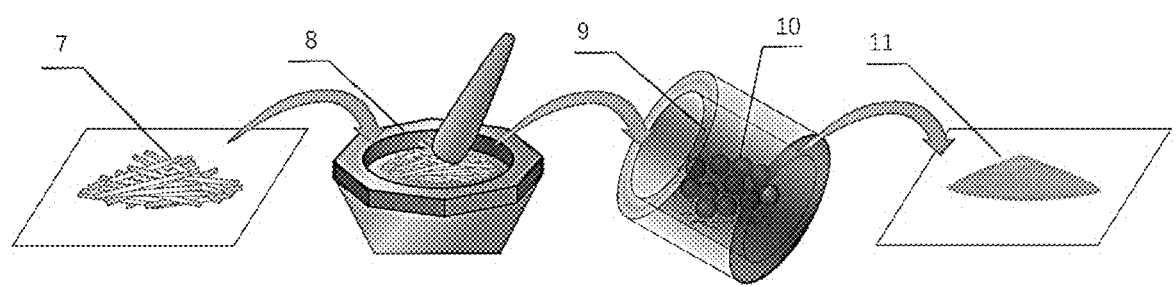
FIG. 2 is a schematic diagram of a grinding process in a step 3 according to Example 1 of the present invention.
Figure 3:
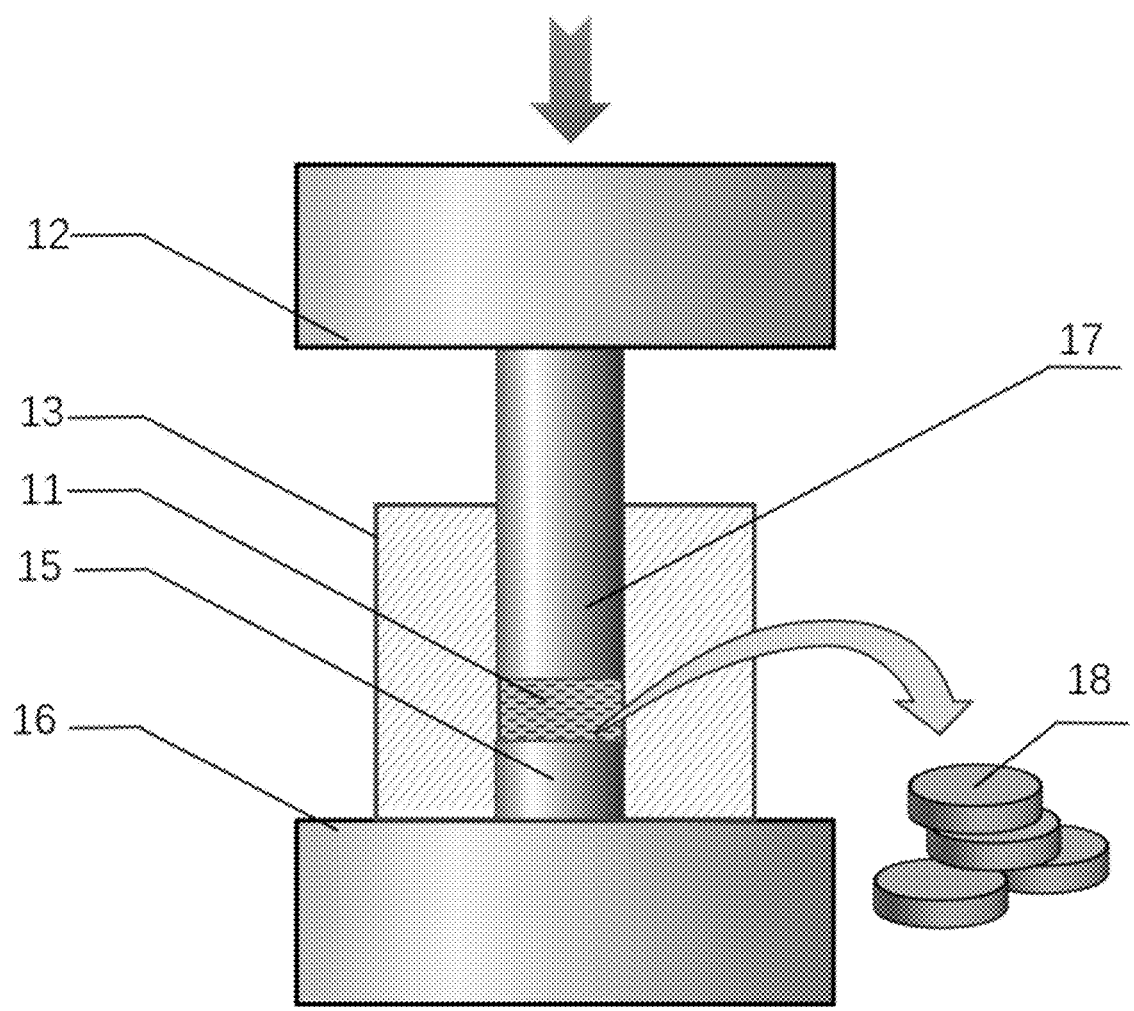
FIG. 3 is a schematic diagram of a process for cold-processing into bulks in a step 4 according to Example 1 of the present invention.
Figure 4:
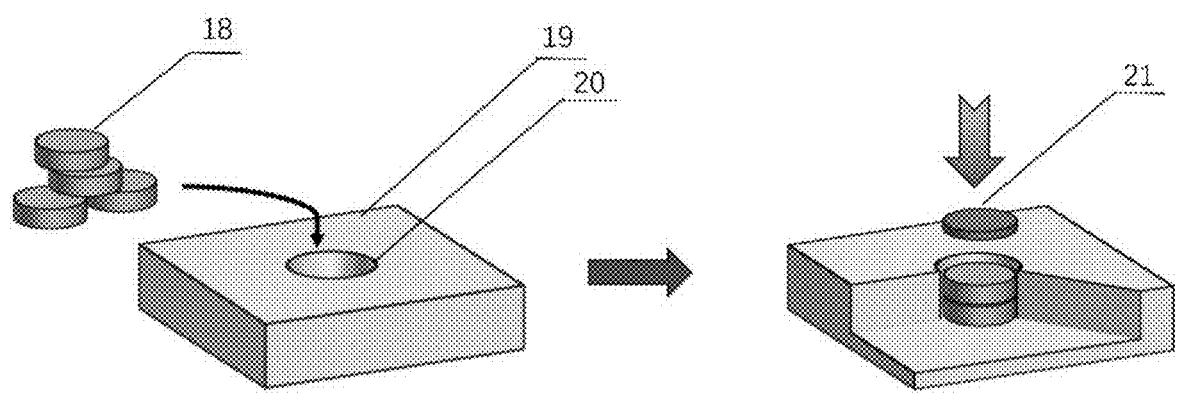
FIG. 4 is a schematic diagram of placing cold-pressed bulks into a stainless steel mold in a step 5 according to Example 1 of the present invention.
Figure 5:
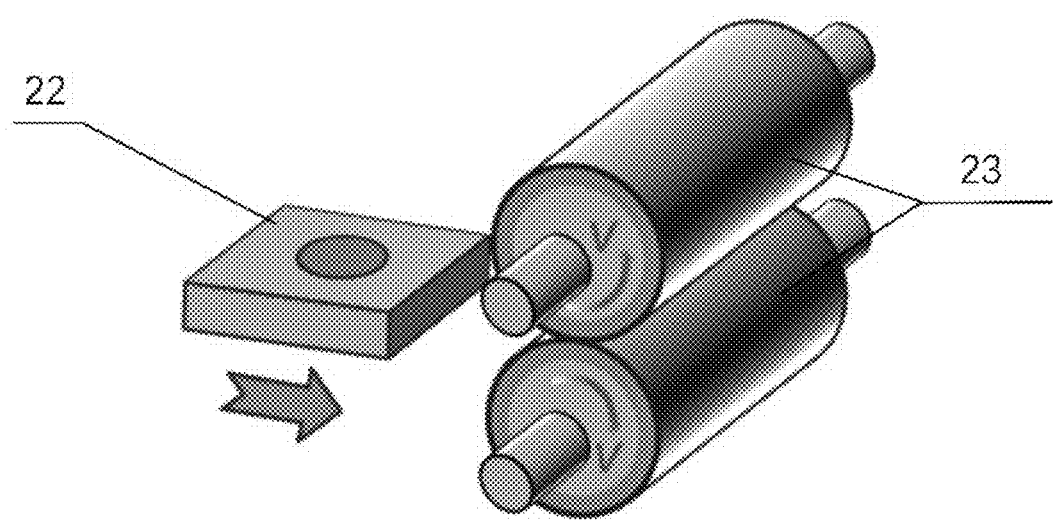
FIG. 5 is a schematic diagram of a rolling process in a step 6 according to Example 1 of the present invention.

A preparation method for an anisotropic $Nd_2Fe_{14}B/\alpha$-Fe bulk nanocrystalline composite permanent magnet material, comprising the following steps:

step 1: a master alloy with a composition of $Nd_9Fe_{84}CuB_6$ was prepared by vacuum smelting;

step 2: the master alloy was crushed into bulks, and the bulks were made into ribbons by means of a melt rapid quenching method, as shown in FIG. 1. Specifically, an alloy bulk 1 obtained from the crushing of the master alloy were placed into a quartz tube 4 with a small aperture at a lower end, the alloy bulk 1 was melted into an alloy melt 5 by heating with a high-frequency copper coil 2, the alloy melt 5 was ejected onto a rapidly rotating copper roller 3 under the action of argon gas with a pressure difference, and an alloy ribbon 7 was then spun and formed; where a rotation speed of the copper roller 3 was 32 m/s, an inner diameter of the quartz tube 4 was 0.6 mm, a distance from a lower tube orifice 6 of the quartz tube 4 to the copper roller 3 was 2 mm, and a melt spinning temperature was 1300° C.; and the obtained alloy ribbon 7 had a thickness of about 13 μm and a width of about 1.5 mm, with an amorphous structure;

step 3: as shown in FIG. 2, the alloy ribbon 7 obtained in the step 2 was placed in an agate mortar 8 for manual grinding; slightly fine particles after being ground were placed into a ball mill jar 9, a ball milling medium 10 was then added to obtain a mixture, the mixture was then ground in a ball mill for 2 min to obtain amorphous powder 11 with a particle size of less than 300 mesh;

step 4: as shown in FIG. 3, the amorphous powder 11 was placed in a cold-pressing mold 13, an inner diameter of the cold-pressing mold 13 was 8 mm, a small pressing rod column 15 was placed at a bottom of an inner hole of the cold-pressing mold 13, the cold-pressing mold 13 filled with the amorphous powder was then placed on a lower cemented carbide press head 16, an upper press rod 17 was then inserted, and an upper carbide press head 12 was mounted, the upper carbide press head 12 and the lower cemented carbide press head 16 applied a pressure together to form a bulk, the resulting bulk 18 had a thickness of 3 mm, and a density of 80%;

step 5: as shown in FIG. 4, a semi-through hole 20 with an inner diameter of 8 mm was pre-machined in a stainless steel plate 19 with a thickness of 10 mm, and a remaining thickness at a bottom of the semi-through hole 20 was 0.5 mm; a total of three bulks 18 were stacked the semi-through hole 20, and the bulks were then pressed into the semi-through hole 20 by a copper sheet 21 using a hydraulic press in an argon protection environment, and an opening of the semi-through hole 20 was sealed; and step 6. the stainless steel plate 19 sealed in the step 5 was heated to 500° C., as shown in FIG. 5, the heated stainless steel plate 22 was then placed into a rolling mill that has been started for rolling, a gap 23 between two rollers was 2 mm, and a roller speed was 0.9 m/s. In this embodiment, a deformation ratio after rolling exceeded 75%; and the rolled sample was taken out to obtain the anisotropic $Nd_2Fe_{14}B/\alpha$-Fe bulk nanocrystalline composite permanent magnet material.

Figure 6:
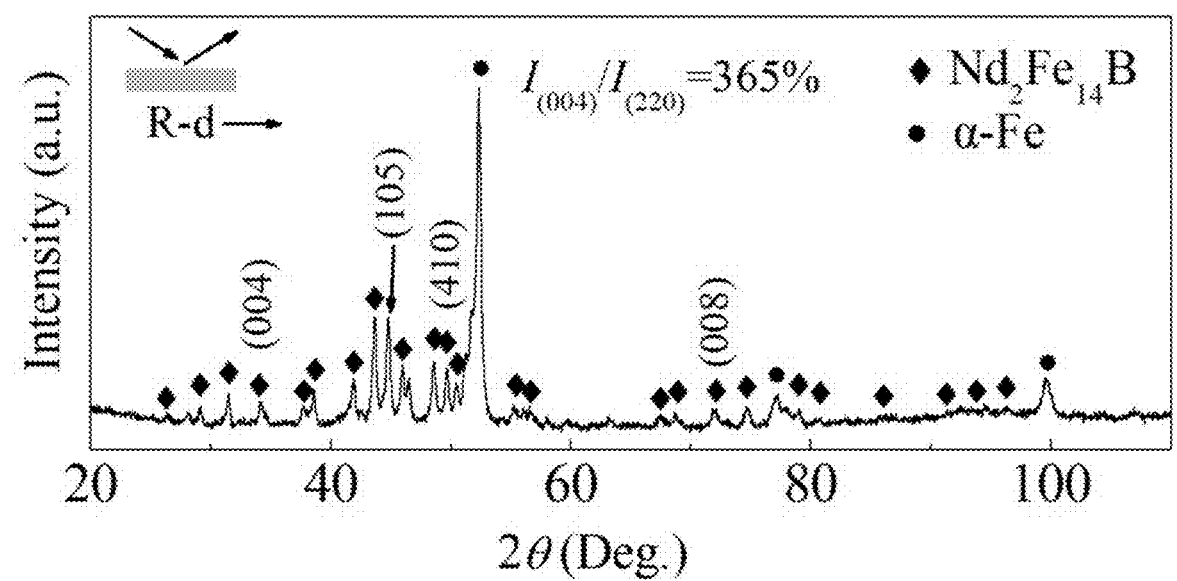
FIG. 6 is an XRD pattern of a permanent magnet material prepared in Example 1 parallel to a hot-rolled plane according to Example 1 of the present invention.
Figure 7:
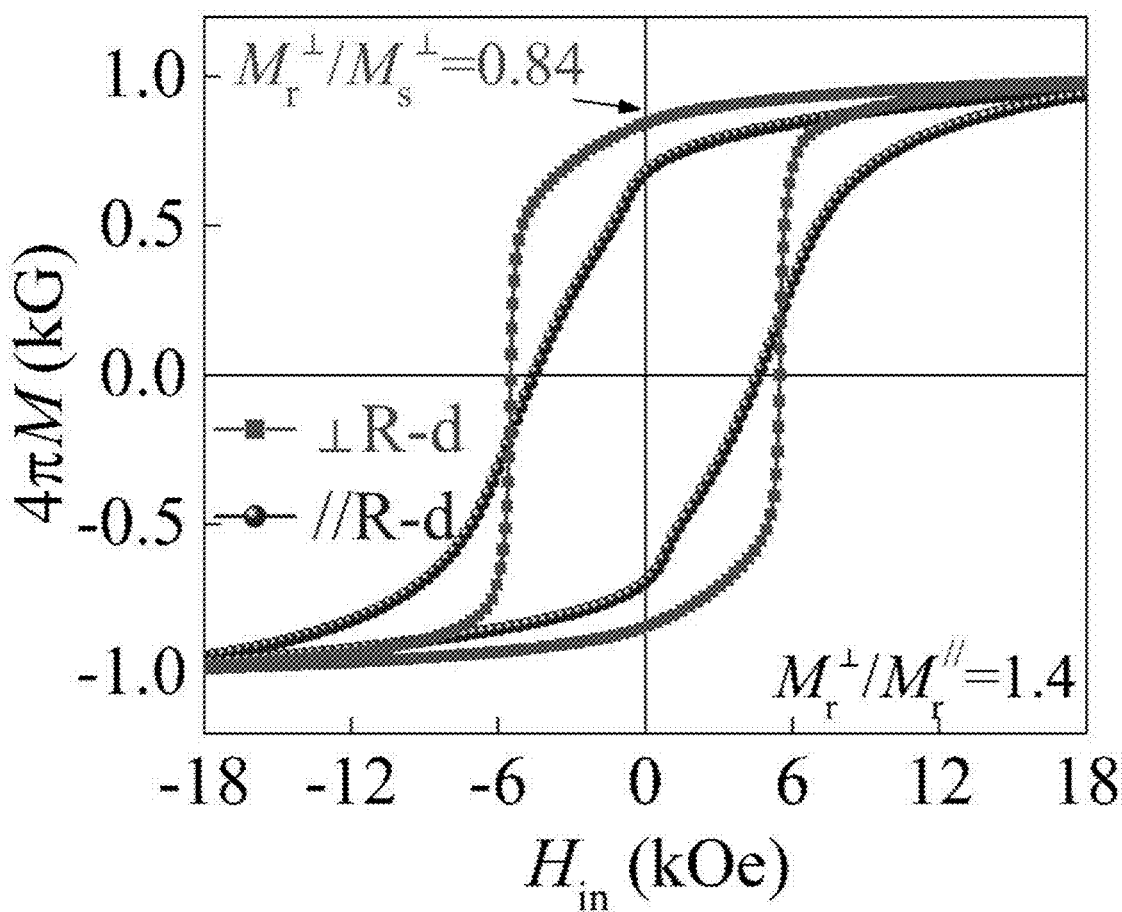
FIG. 7 is a diagram showing hysteresis loops of easy and hard magnetization directions of a permanent magnet material prepared according to Example 1 of the present invention.

An anisotropic permanent magnet material prepared in this embodiment can be evaluated based on its microstructure and magnetic properties: FIG. 6 shows an XRD pattern of the permanent magnet material parallel to a hot-rolled plane. In the figure, "R-d" is the abbreviation for "rod direction," indicating that the direction indicated by the arrow is a rolling direction. It can be seen from the pattern that a ratio of a diffraction peak (004) to a strongest peak (220) of the $Nd_2Fe_{14}B$ phase is 365%, which is significantly higher than a ratio of 67.5% on a standard PDF card, indicating a preferred orientation of the diffraction peak (004). FIG. 7 shows hysteresis loops of the magnet parallel and perpendicular to the rolling direction. It can be clearly seen that the magnet prepared by the method exhibits obvious magnetic anisotropy. A magnetic energy product of the sample is 22.1 MGOe, and a volume fraction of the $\alpha$-Fe phase is 32.8%.

The description above is merely the preferred embodiments of the present invention, it should be pointed out that those of ordinary skill in the art can also make some improvements and modifications without departing from the principle of the present invention, and these improvements and modifications should also fall within the scope of protection of the present invention.

What is claimed is:

1. A preparation method for an anisotropic $Nd_2Fe_{14}B/\alpha$-Fe bulk nanocrystalline composite permanent magnet material, comprising the following steps:
   step 1. preparing a master alloy;
   step 2. crushing the master alloy prepared in the step 1 into bulks, and preparing amorphous ribbons by means of a melt rapid quenching method;
   step 3. grinding the amorphous ribbons obtained in the step 2 to obtain amorphous powder;
   step 4. cold-pressing the powder obtained in the step 3 into bulks; and
   step 5. placing the bulks obtained in the step 4 into a stainless steel mold, heating and then rolling the bulks; wherein
   the stainless steel mold is of a plate-shaped structure, and a chamber for accommodating the bulks is formed in the stainless steel mold in a thickness direction thereof.

2. The preparation method according to claim 1, wherein in the step 5, a temperature of the heating is 500-530° C.

3. The preparation method according to claim 1, wherein in the step 5, an inner diameter of the chamber matches an outer diameter of the bulk.

4. The preparation method according to claim 1, wherein in the step 5, after placing the bulk into the chamber formed in the stainless steel mold, the chamber is sealed using a metal material, and the sealing is performed in an inert atmosphere.

5. The preparation method according to claim 4, wherein the metal material is copper.

6. The preparation method according to claim 1, wherein the stainless steel mold is a plate-shaped mold with a thickness of 5-10 mm; and a bottom thickness of the chamber is 0.3-0.5 mm, and the bottom thickness of the chamber refers to a thickness of the stainless steel at a bottom of the chamber.

7. The preparation method according to claim 1, wherein in the step 5, a roller speed of the rolling is 0.9-1.5 m/s.

8. The preparation method according to claim 1, wherein in the step 5, during the rolling process, a degree of deformation of the bulks is ≥70%.

9. The preparation method according to claim 1, wherein in the step 1, the master alloy has a chemical composition shown in formula (1) as follows:

$$Nd_xFe_{y-m}B_zX_m; \quad (1)$$

in the formula (1), X is an additive element selected from at least one of Nb, Zr, Ti, Cu, Ga and Al; and m denotes a total atomic percentage of the additive element; the atomic percentage of a single additive element does not exceed 1 at %; and x, y, and z denote atomic percentages, wherein x is 8-10 at %, y is 84-88 at %, and z is 4-6 at %.

10. The preparation method according to claim 1, wherein in the step 1, the preparing a master alloy is carried out by a vacuum melting method.

11. The preparation method according to claim 1, wherein in the step 2, a rapid quenching speed during the melt rapid quenching is 27-32 m/s.

12. The preparation method according to claim 1, wherein in the step 2, a melt spinning temperature during the melt rapid quenching is 1250-1350° C.

13. The preparation method according to claim 1, wherein in the step 2, a thickness of the amorphous ribbons is 10-15 μm.

14. The preparation method according to claim 1, wherein in the step 3, the grinding is performed until a particle size of the amorphous powder is ≤300 mesh.

15. The preparation method according to claim 1, wherein in the step 4, a density of the cold-pressing into bulks ≥80%.

* * * * *